(12) United States Patent
Balasaygun et al.

(10) Patent No.: US 9,143,597 B2
(45) Date of Patent: Sep. 22, 2015

(54) METHOD FOR TELEPHONY CLIENT SYNCHRONIZATION IN TELEPHONE VIRTUALIZATION

(75) Inventors: Mehmet C. Balasaygun, Freehold, NJ (US); John Buford, Princeton, NJ (US); Venkatesh Krishnaswamy, Holmdel, NJ (US); Xiaotao Wu, Metuchen, NJ (US)

(73) Assignee: Avaya Inc., Basking Ridge, NJ (US)

( * ) Notice: Subject to any disclaimer, the term of this patent is extended or adjusted under 35 U.S.C. 154(b) by 943 days.

(21) Appl. No.: 12/563,289

(22) Filed: Sep. 21, 2009

(65) Prior Publication Data

US 2011/0070873 A1    Mar. 24, 2011

(51) Int. Cl.
G06F 15/16 (2006.01)
H04M 1/725 (2006.01)
H04M 1/247 (2006.01)

(52) U.S. Cl.
CPC ........ H04M 1/72519 (2013.01); H04M 1/2477 (2013.01); H04M 2250/62 (2013.01)

(58) Field of Classification Search
CPC .............. G06F 9/45533; G06F 9/455; H04M 1/72519; H04M 1/2477; H04M 2250/62; H04L 65/1006
USPC ........................................................ 709/228
See application file for complete search history.

(56) References Cited

U.S. PATENT DOCUMENTS

| 7,439,937 | B2 | 10/2008 | Ben-Shachar et al. |
| 7,555,522 | B2 | 6/2009 | Klassen et al. |
| 2003/0074451 | A1 | 4/2003 | Parker et al. |
| 2004/0127251 | A1 | 7/2004 | Thakkar et al. |
| 2005/0138124 | A1 | 6/2005 | Klassen et al. |
| 2005/0198029 | A1 | 9/2005 | Pohja et al. |
| 2006/0252464 | A1 | 11/2006 | Vander Veen et al. |
| 2006/0291481 | A1* | 12/2006 | Kumar .................. 370/400 |
| 2007/0088762 | A1* | 4/2007 | Harris et al. .............. 707/201 |
| 2007/0168953 | A1 | 7/2007 | Diez et al. |
| 2007/0171921 | A1 | 7/2007 | Wookey et al. |
| 2007/0189520 | A1 | 8/2007 | Altberg et al. |
| 2008/0005239 | A1 | 1/2008 | Podl |
| 2008/0318616 | A1 | 12/2008 | Chipalkatti et al. |
| 2009/0036111 | A1* | 2/2009 | Danford et al. ............ 455/419 |
| 2009/0059965 | A1 | 3/2009 | Lin et al. |
| 2009/0187854 | A1 | 7/2009 | Murtagh |
| 2009/0249332 | A1 | 10/2009 | Hoehle et al. |
| 2010/0017482 | A1 | 1/2010 | Piccinini et al. |
| 2010/0074155 | A1 | 3/2010 | Park et al. |
| 2010/0131625 | A1 | 5/2010 | Dehaan et al. |
| 2010/0211769 | A1 | 8/2010 | Shankar et al. |
| 2010/0235523 | A1 | 9/2010 | Garcia et al. |

(Continued)

OTHER PUBLICATIONS

General Purpose Hardware Abstraction Layer for Multiple Virtual Machine in Mobile Devices, Lee, Sang-Main, Feb. 15-18, 2009, IEEE, ICACT 2009.

Primary Examiner — John Macilwinen

(57) ABSTRACT

A method for synchronizing telephony applications running on different system software images is provided. When a telecommunications session is conducted by a first telephony application, the first telephony application controls the state of the telecommunications session through a signaling protocol stack executing on the same system software image as the first telephony application (or on a virtualization layer). The present invention allows the sharing of the signaling protocol stack by multiple telephony applications running on different system software images.

20 Claims, 7 Drawing Sheets

(56) References Cited

U.S. PATENT DOCUMENTS

2010/0241483 A1 9/2010 Haynes et al.
2010/0330961 A1* 12/2010 Rogel .......................... 455/411
2011/0003585 A1 1/2011 Wang et al.
2011/0098089 A1 4/2011 Irie et al.

* cited by examiner

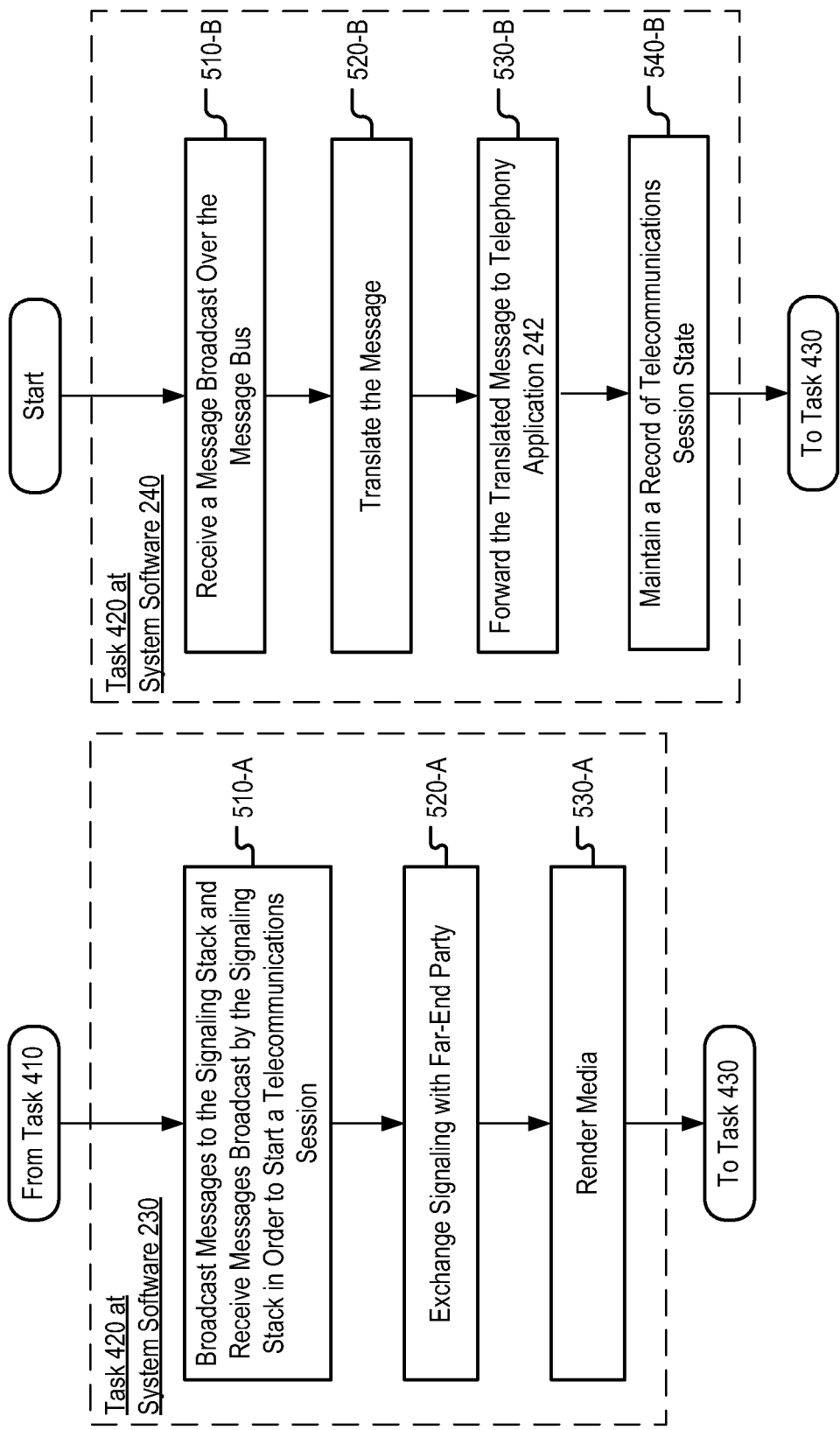

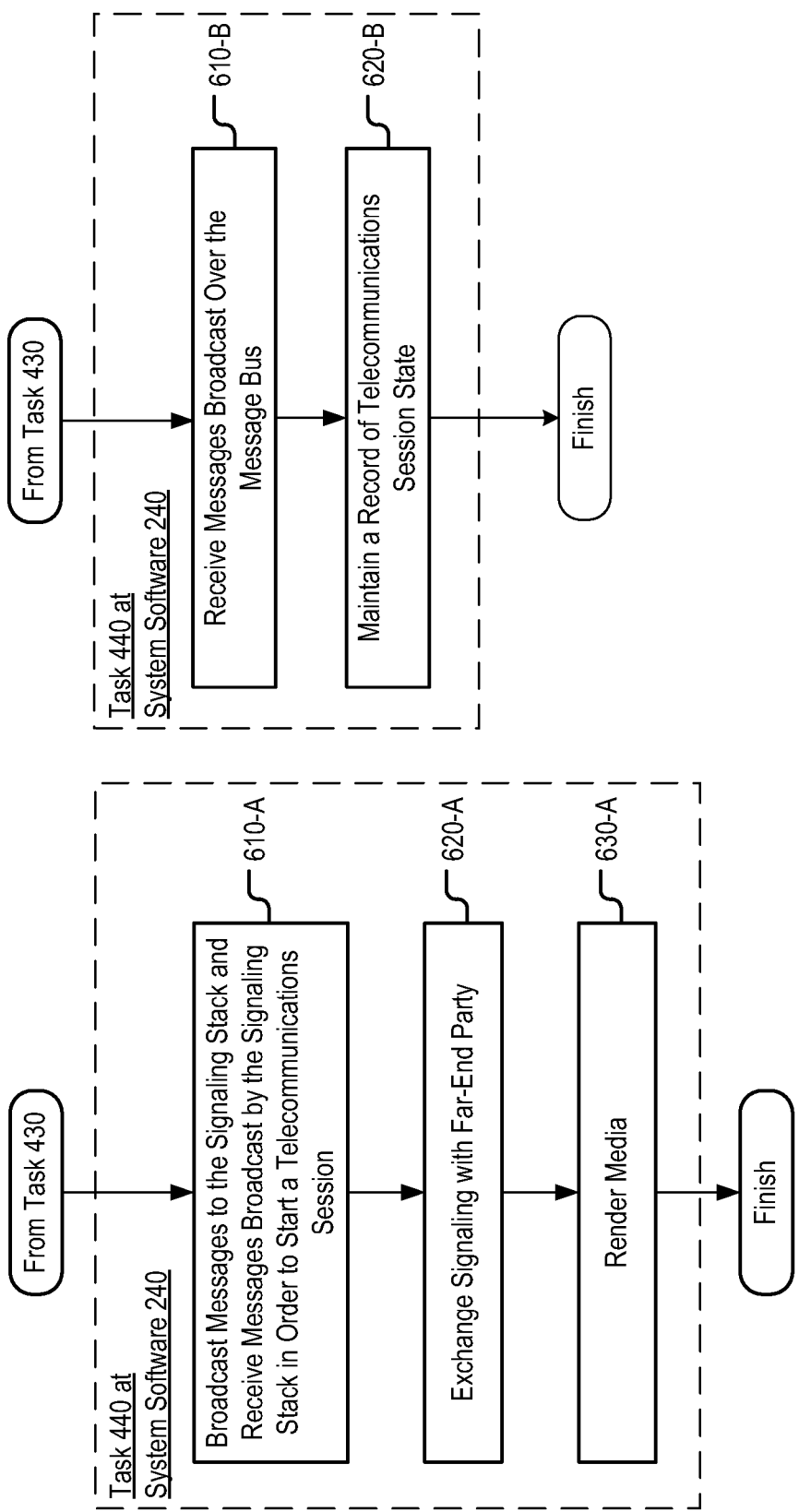

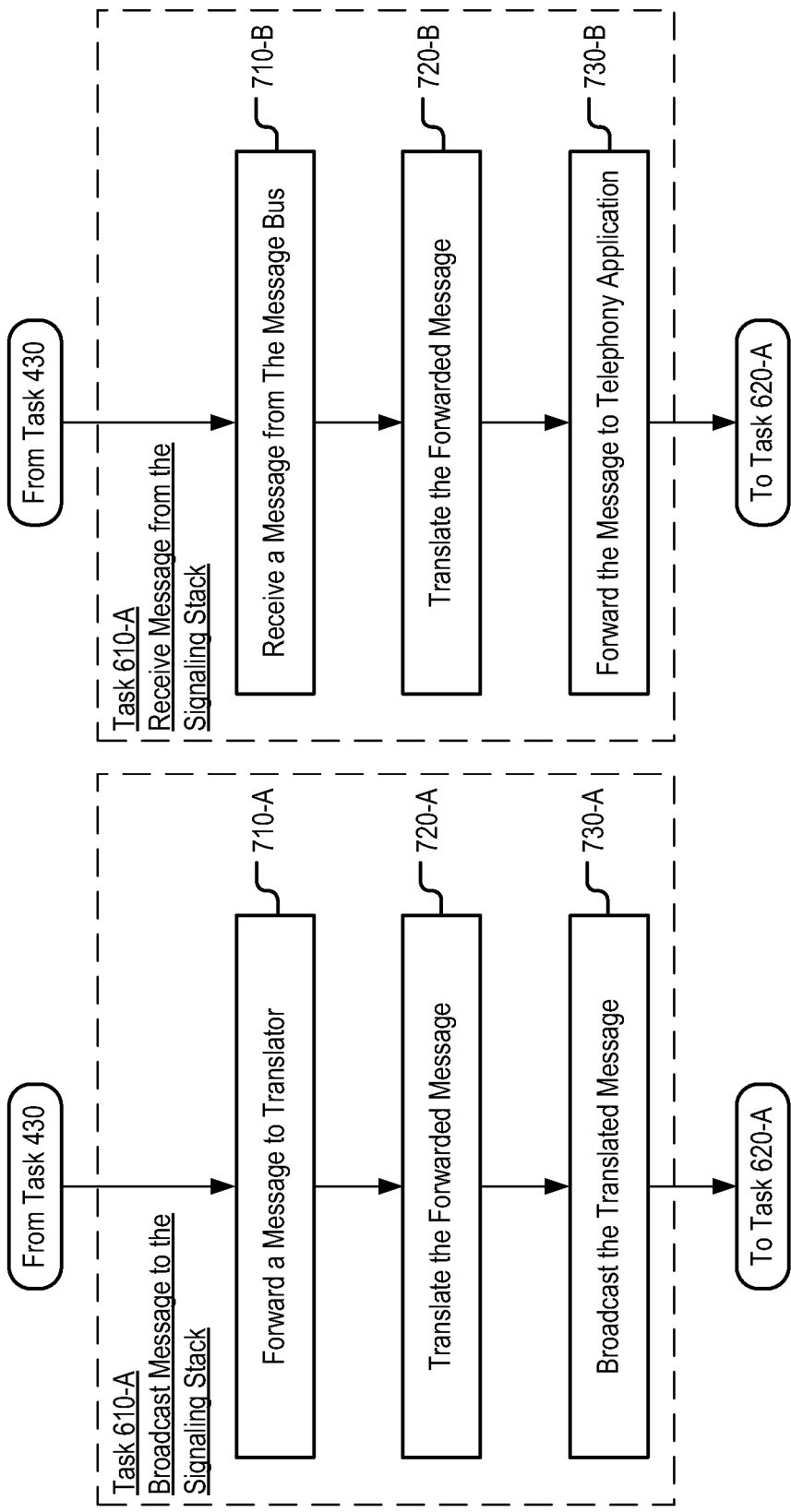

METHOD FOR TELEPHONY CLIENT SYNCHRONIZATION IN TELEPHONE VIRTUALIZATION

FIELD OF THE INVENTION

The present invention relates to telecommunications in general, and, more particularly, to telephony applications.

BACKGROUND OF THE INVENTION

Telephone receivers differ in their features. Some manufacturers produce telephones suited for business users that provide robust productivity applications, such as conference schedulers and email clients. Other manufacturers make telephones suited for entertainment that come with entertainment applications, such as video games. When a user wants to buy a telephone receiver, he or she has to choose between having either the productivity applications provided by one manufacturer or the entertainment applications provided by another.

The need to make such choice can be avoided by using hardware virtualization. Both the operating system of the business telephone and the operating system of the entertainment telephone can execute on the same device concurrently, if hardware virtualization is used. This way, when at work, the user can access the productivity applications needed for his or her work on the "business operating system." And when at home, the user can use the entertainment applications running on the "entertainment operating system."

However, a significant drawback of present virtualization techniques is that virtualized telephone receivers cannot switch between operating systems seamlessly. If the user receives a business-related call at home, the user will not be able to answer the call and then switch to the business operating system without terminating the call first. The connection has to be terminated because, in general, virtualized operating systems running in a virtualized environment are isolated from each other.

In order for the telephony application executing on the business operating system to be able to take control over the telephone call, it needs at least some information about the phone call state, such as identity of the far-end party, media type used for the phone call (e.g. video, voice, etc.), and so forth. This information, while readily accessible from the entertainment operating system, is not accessible from the business operating system because the two operating systems are isolated. So, the telephony application executing on the business operating system cannot access the needed state information and it cannot take control over the phone call.

Therefore, a need exists for a method that would allow the sharing of information about the state of a telecommunications session across a plurality of system software images running on the same device.

SUMMARY OF THE INVENTION

The present invention answers this need by providing a method for synchronizing telephony applications running on different system software images. When a telecommunications session is conducted by a first telephony application, the first telephony application typically controls the state of the telecommunications session through a signaling protocol stack executing on the same system software image as the first telephony application (or on a virtualization layer). The present invention allows the sharing of the signaling protocol stack by multiple telephony applications running on different system software images. Importantly, in the present invention the first and second telephony applications need not know about each other and need not be modified in order to share the signaling protocol stack.

In accordance with one embodiment of the present invention, a telecommunications session is conducted by a first telephony application and a far-end party. During the course of the telecommunications session, messages between the first telephony application and a signaling protocol stack are broadcast on a message bus shared by the signaling protocol stack, first telephony application, and a second telephony application. Because the second telephony application is executing on a different system software image than both the first telephony application and the signaling protocol stack, a translator is utilized to translate the messages broadcast by the first telephony application and the signaling protocol stack.

The translator translates the messages to a form readable by the second telephony application. It receives messages broadcast over the message bus, by either the first telephony application or the signaling stack, translates them, and forwards the translated messages to the second telephony application which processes the translated messages in order to maintain a record of the state of the telecommunications session. Maintaining the state record allows the second telephony application to take control of the ongoing telecommunications session when the user decides to switch to the system software image in which the second telephony application is running.

This arrangement is analogous to a setting in which a pilot and a co-pilot fly an aircraft. In this setting, the pilot controls the state of the aircraft while the co-pilot observes and remains prepared to take control over the aircraft when need becomes. In a similar fashion, the second telephony application observes at least some actions taken by the first telephony application and the signaling protocol stack during the conduct of a telecommunications session. In doing so, the second telephony application keeps track of the state of the telecommunications session. It remains prepared to take control when the user decides to switch the active system software running on his telecommunications terminal and start using the second telephony application (which is running on a different system software image) for the conduct of the telecommunications session.

Furthermore, after the second telephony application takes control of the telecommunications session, it channels messages intended for the signaling stack through the translator. The translator translates the messages and broadcasts them over the message bus. The signaling stack receives the messages sent over the message bus by the translator, processes them, and changes the state of the telecommunications session accordingly.

In another illustrative embodiment of the present invention, the first telephony application and second telephony application are running within the same system software image. A translator and a message bus are used in the same way as described above in order to share a single signaling protocol stack.

The following disclosure teaches examples of the embodiments and their operation.

BRIEF DESCRIPTION OF THE DRAWINGS

FIG. 5A depicts a flowchart of the salient subtasks performed by telephony application 232 and signaling task 233 in the execution of task 420.

FIG. 5B depicts a flowchart of the salient subtasks performed by telephony application 242 and translator 244 in the execution of task 420.

FIG. 6A depicts a flowchart of the salient subtasks performed by telephony application 242 and translator 244 in the execution of task 440.

FIG. 6B depicts a flowchart of the salient subtasks performed by telephony application 232 in the execution of task 440.

FIG. 7A depicts a flowchart of the execution of the salient subtasks of task 610-A that are associated with the broadcasting of messages by telephony application 242.

FIG. 7B depicts a flowchart of the execution of the salient subtasks of task 610-A that are associated with the receiving of messages broadcast over message bus 310 by telephony application 242.

DETAILED DESCRIPTION

Figure 1:
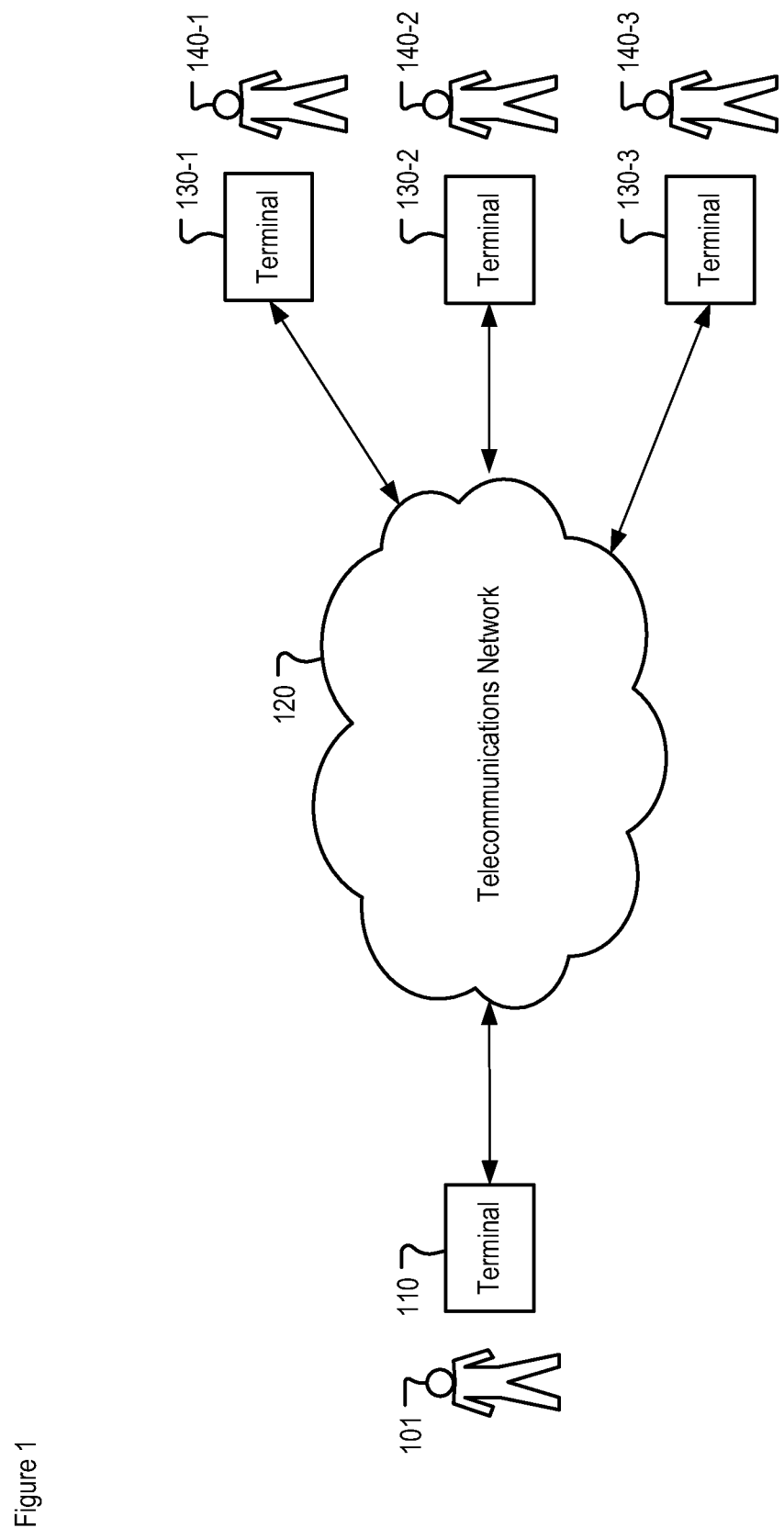
FIG. 1 depicts a schematic diagram of the salient components of the illustrative embodiment of the present invention.

FIG. 1 depicts a schematic diagram of the salient components of the illustrative embodiment of the present invention. The illustrative embodiment comprises user 101, user 140-$i$, wherein i∈{1, 2, 3}, terminal 110, telecommunications network 120, and terminal 130-$i$.

User 101 is a natural person using terminal 110 in well known fashion.

Terminal 110 is a desk set telephone receiver capable of running two or more operating systems in a virtualized fashion. In accordance with the illustrative embodiment of the present invention, terminal 110 is capable of both voice and video telecommunications, but it will be clear to those skilled in the art, after reading this disclosure, how to make and use alternative embodiments of the present invention in which terminal 110 has only a voice capability. Furthermore, it will be clear to those skilled in the art, after reading this disclosure, how to make and use alternative embodiments of the present invention in which terminal 110 is another type of telecommunications device (e.g. cellular telephone, 2-way radio, portable digital assistant, soft phone, etc.).

Telecommunications network 120 transports signals between terminal 110 and terminals 130-$i$. In accordance with the illustrative embodiment of the present invention, telecommunications network 120 is the Internet, but it will be clear to those skilled in the art, after reading this disclosure, how to make and use alternative embodiments of the present invention in which telecommunications network 120 is any type of telecommunications network (e.g. local area network, the Public Switched Telephone Network, Sonet, ATM, cellular network, etc.)

Terminal 130-$i$ is a telephone receiver capable of conducting telecommunications sessions with terminal 110. In accordance with the illustrative embodiment of the present invention, terminal 110 is capable of conducting both audio and video telephone calls but it will be clear to those skilled in the art, after reading this disclosure, how to make and use alternative embodiments of the present invention in which terminal 110 has only a voice capability. Furthermore, it will be clear to those skilled in the art, after reading this disclosure, how to make and use alternative embodiments of the present invention in which terminal 110 is another type of telecommunications device (e.g. cellular telephone, 2-way radio, portable digital assistant, soft phone, desktop computer, etc.).

User 140-$i$ is a natural person using terminal 130-$i$ in well known fashion.

Figure 2:
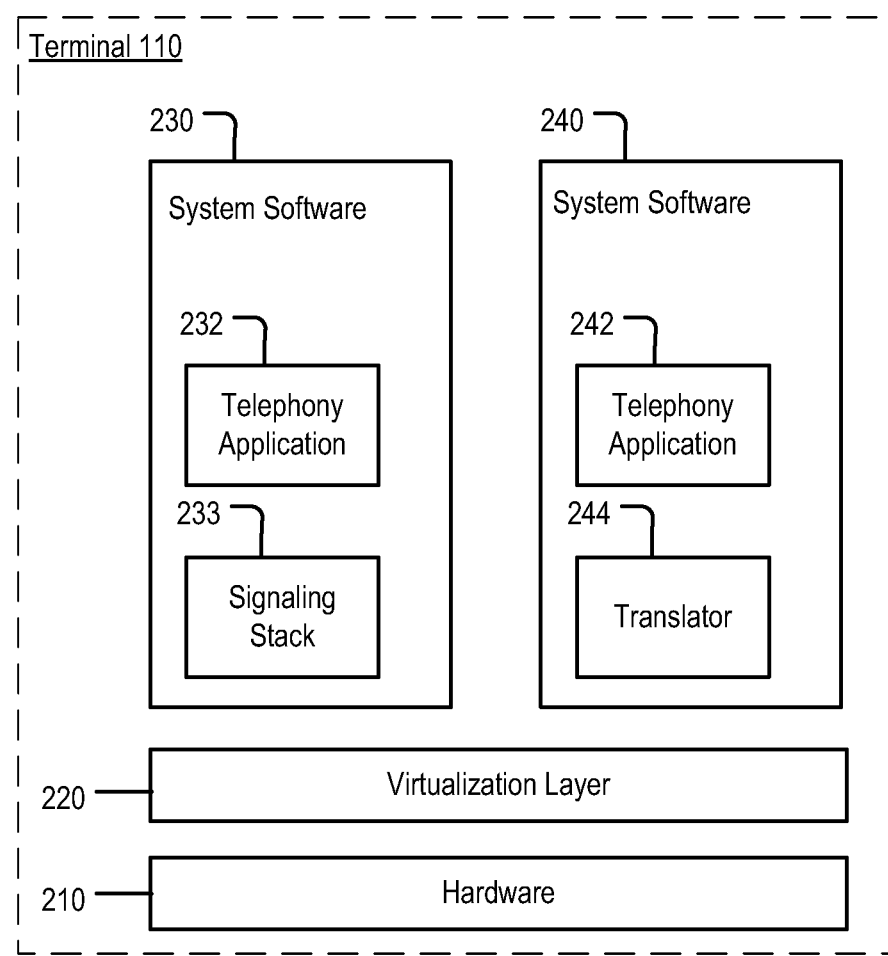
FIG. 2 depicts a schematic diagram of the salient components of the illustrative embodiment of the present invention.

FIG. 2 depicts a schematic diagram of the salient components of the illustrative embodiment of the present invention. The illustrative embodiment comprises first system software image 230, second system software image 240, virtualization layer 220, hardware 210, telephony application 232, telephony application 242, signaling protocol stack 233, and translator 244.

Hardware 210 is the electronic components that comprise terminal 110, such as, for example, and without limitation, processor (single-core or multi-core), memory, transceiver, network interface, display, sound interface, video interface, etc. Hardware 210 is capable of executing system software and one or more telephony applications. It will be clear to those skilled in the art how to make and use hardware 210.

Virtualization Layer 220 is a software layer that facilitates the sharing of the resources of hardware 210 by multiple system software images. In accordance with the illustrative embodiment of the present invention, virtualization layer 220 is an OKL4 microkernel, but it will be clear to those skilled in the art, after reading this disclosure, how to make and use alternative embodiments of the present invention in which virtualization layer 220 is any other Type 1 hypervisor (e.g. Xen™, VMware ESX Server™, etc.) or any other hosted virtual machine (e.g. QEMU™, VMware Workstation™, etc.).

System Software 230 is an image of the Android operating system that is running on top of virtualization layer 220. It will be clear to those skilled in the art, after reading this disclosure, how to make and use alternative embodiments of the present invention in which System Software 230 is any type of system software, firmware, or software platform that is capable of executing one or more software applications, such as, for example, and without limitation, Nokia Series 40 Platform™, Nokia Series 60 Platform™, Embedded Linux, Symbian OS™, Linux, BlackBerry OS™, etc. In accordance with the illustrative embodiment of the present invention, both telephony application 232 and signaling protocol stack 233 are executing on system software 230.

Signaling protocol stack 233 is a Session Initiation Protocol (SIP) stack. The signaling protocol stack is configured to register one or more user agents on a Session Initiation Protocol (SIP) network and forward incoming messages from telecommunications network 120 to telephony application 232 and/or telephony application 242. Furthermore, signaling protocol stack 233 is configured to route outgoing signaling messages from telephony application 232 and/or telephony application 242 to telecommunications network 120. Those skilled in the art will recognize that signaling protocol stack 233 provides telephony applications 232 and 242 with an application programming interface (API) for the creating and transmitting of Session Initiation Protocol (SIP) messages. Moreover, those skilled in the art will recognize that signaling protocol stack 233, is also capable of maintaining an information record concerning the state of a telecommunications session, such as, for example, and without limitation, callback function (or listener) registration, far-end party addresses, application identification numbers, etc.

Although, in accordance with the illustrative embodiment of the present invention, signaling protocol stack 233 uses the Session Initiation Protocol (SIP), it will be clear to those skilled in the art, after reading this disclosure, how to make and use alternative embodiments of the present invention in which signaling protocol stack 233 uses any other communications protocol, such as, and without limitation, H.323, P2P-SIP, Skype, and so forth. Furthermore, in accordance with the illustrative embodiment of the present invention, signaling protocol stack 233 is running on system software 230, but it will be clear to those skilled in the art, after reading this disclosure, how to make and use alternative embodiments of the present invention in which signaling protocol stack 233 is executing on system software 240, virtualization layer 220, or system software that is host to virtualization layer 220.

Telephony application 232 is a software application for conducting telephone conversations. In accordance with the illustrative embodiment of the present invention, telephony application 232 is compatible with the application programming interface (API) provided by signaling protocol stack 233. It is capable of reading and processing messages sent by the signaling protocol stack via message bus 310, reading and processing data structures and variables indicated by the messages, as well as executing any callback (or listener) functions identified by the messages. It will be clear to those skilled in the art, after reading this disclosure, how to make and use alternative embodiments of the present invention in which telephony application 232 is any type of telecommunications application (e.g. instant messenger, video phone, audio enabled instant messenger, Skype, Google Talk, Yahoo Instant Messenger, etc.).

System software 240 is an image of the Symbian™ operating system that is running on top of virtualization layer 220 concurrently with system software 230. It will be clear to those skilled in the art, after reading this disclosure, how to make and use alternative embodiments of the present invention in which System Software 230 is any type of system software, firmware, or software platform that is capable of executing one or more software applications, such as, for example, and without limitation Nokia Series 40 Platform™, Nokia Series 60 Platform™, Embedded Linux, Symbian OS™, Linux, BlackBerry OS™, etc. In accordance with the illustrative embodiment of the present invention, both telephony application 242 and translator 244 are executing on system software 240.

Telephony application 242 is a software application for conducting telephone conversations. In accordance with the illustrative embodiment of the present invention, telephony application 242 is different software from telephony application 232, however, it will be clear to those skilled in the art, after reading this disclosure, in which telephony applications 232 and 242 are the same software. Furthermore, it will be clear to those skilled in the art, after reading this disclosure, how to make and use alternative embodiments of the present invention in which telephony application 242 is any type of telecommunications application (e.g. instant messenger, a video phone, audio enabled instant messenger, Skype™, Google Talk™, Yahoo Instant Messenger™, etc.).

In contrast to telephony application 232, telephony application 242 does not natively support signaling protocol stack 233. Telephony application 242 is not capable of reading and processing messages sent by the signaling protocol stack via message bus 310, reading and processing data structures and variables indicated by those messages, as well as executing one or more callback functions identified by those messages. In other words, telephony application 242 does not support the application programming interface (API) provided by signaling protocol stack 233. And for this reason, telephony application 242 uses translator 244 to adapt messages of which telephony application 242 is either the producer or the recipient to a format compatible with either the application programming interface (API) of the signaling protocol stack or the application programming interface (API) supported by telephony application 242.

Translator 244 is a software wrapper that acts as an adapter between telephony application 242 and signaling protocol stack 233 and between telephony application 232 and telephony application 242. Translator 244 is configured to act as a virtual device driver and it allows telephony application 242 to utilize the functionality of signaling protocol stack 233. It provides an Application Programming Interface (API) which telephony application 242 calls when it needs access to the functionality of signaling protocol stack 233. When called by telephony application 242, translator 244 translates outgoing messages from telephony application 242 into a form that is readable by signaling protocol stack 233 and telephony application 232 before broadcasting the translated messages over message bus 310. Furthermore, translator 244 receives messages broadcast on message bus 310, translates them into a form readable by telephony application 242, and forwards the translated messages to telephony application 242. And still furthermore, translator 244 translates data that is forwarded by telephony application 242 to a form that is readable by telephony application 232 and signaling protocol stack 233, as well as it translates data broadcast by telephony application 232 and signaling protocol stack 233 to a form that is readable by telephony application 242.

Stated succinctly, translator 244 provides functionality similar to other software wrappers known in the art. But, in accordance with the illustrative embodiment of the present invention, translator 244 is used to connect a telephony application executing on first system software with a signaling protocol stack executing on second system software via a message bus. In accordance with the illustrative embodiment of the present invention, translator 244 is running on system software 240, but it will be clear to those skilled in the art, after reading this disclosure, how to make and use alternative embodiments of the present invention in which translator 244 is executing on virtualization layer 220, or system software that is host to virtualization layer 220.

Figure 3:
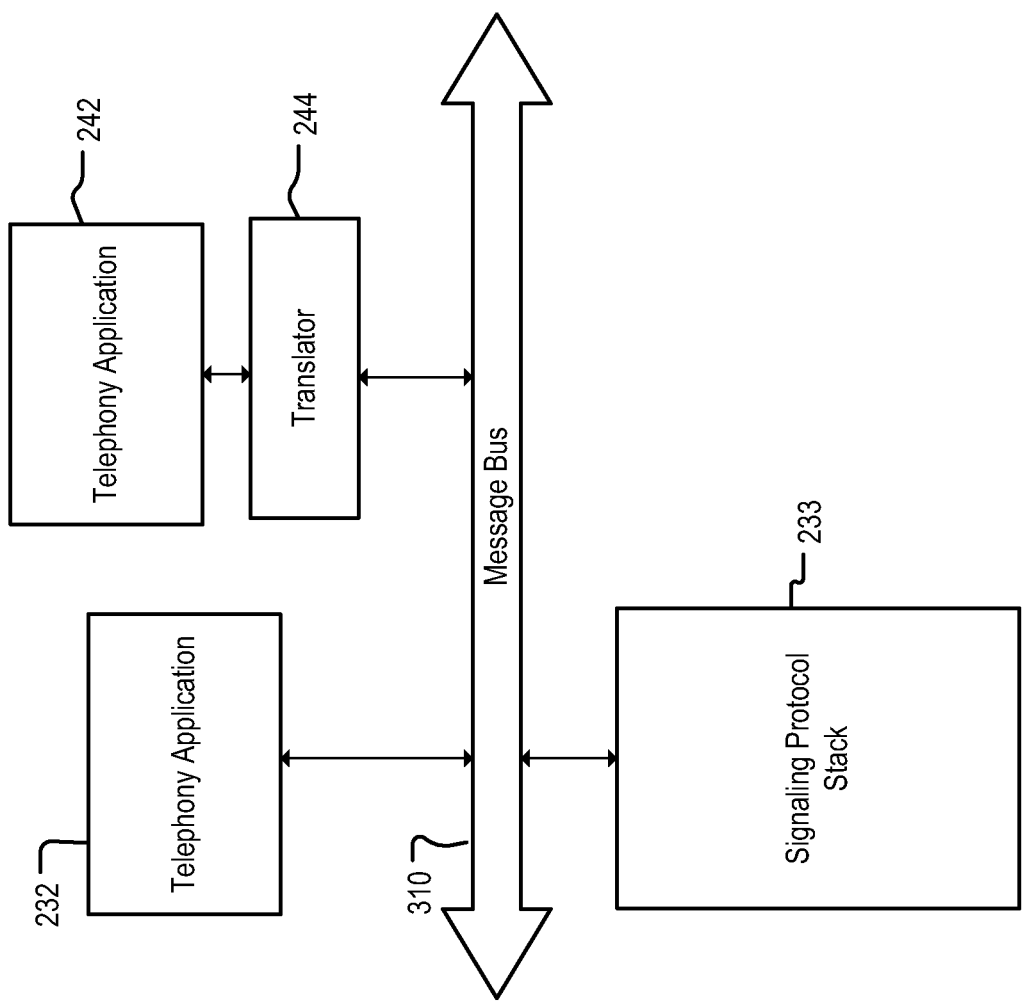
FIG. 3 depicts a schematic diagram of the salient components of the illustrative embodiment of the present invention.

FIG. 3 depicts a schematic diagram of the salient components of the illustrative embodiment of the present invention. The illustrative embodiment comprises telephony application 232, signaling protocol stack 233, telephony application 242, translator 244, and message bus 310.

Message bus 310 is a software bus which telephony application 232, telephony application 242, and signaling protocol stack 233 use to exchange information with the illusion of broadcasting this information. In accordance with the illustrative embodiment of the present invention, when one of the telephony applications wants to call a function provided by the application programming interface (API) of signaling protocol stack 233, it places a message on the bus identifying the function and indicating the function parameters. The broadcast message is received by both signaling protocol stack 233 and the other telephony application allowing the two telephony applications to maintain a synchronized state. In accordance with the illustrative embodiment of the present invention, message bus 310 is implemented through mapping messages from one of signaling protocol stack 233, telephony application 232, and telephony application 242 to shared memory accessible by all three entities. However, it will be clear to those skilled in the art, after reading this disclosure, how to make and use alternative embodiments of the present invention in which the message bus is implemented through a network interface and/or network protocol, such as, and without limitation, Internet Protocol, Asynchronous Transfer Mode Protocol, Hypertext Transfer Protocol, Simple Object Access Protocol, etc.

Figure 4:
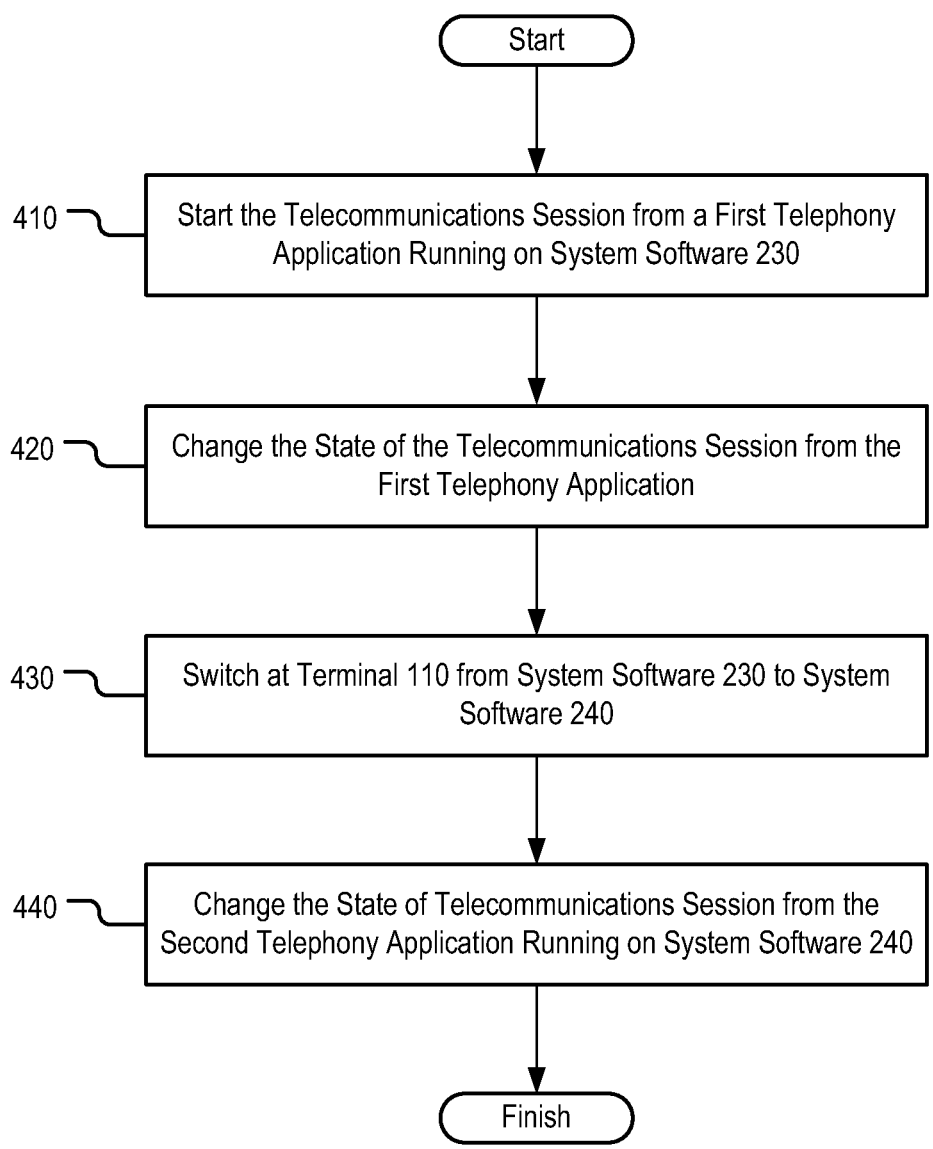
FIG. 4 depicts a flowchart of the execution of the salient tasks associated with the operation of the illustrative embodiment of the present invention.

FIG. 4 depicts a flowchart of the execution of the salient tasks associated with the operation of the illustrative embodiment of the present invention. It will be clear to those skilled in the art, after reading this disclosure, how to perform the tasks associated with FIG. 4 in a different order than represented or to perform one or more of the tasks concurrently. Furthermore, it will be clear to those skilled in the art, after reading this disclosure, how to make and use alternative embodiments of the present invention that omit one or more of the tasks.

At task 410, telephony application 232 initiates a telecommunications session with user 140-3. Task 410 is further described in the discussions with respect to FIG. 5A and FIG. 5B.

At task 420, telephony application 232 changes the state of the telecommunications session initiated at task 410. In accordance with the illustrative embodiment of the present invention, telephony application 232 joins user 140-1 to the telecommunications session, but it will be clear to those skilled in the art, after reading this disclosure, how to make and use alternative embodiments of the present invention in which the change of state is any change of state permitted by the telecommunications protocol used for the telecommunications session. Task 420 is executed in identical fashion to task 410—namely, through the exchange of messages, via message bus 310, between telephony application 232 and signaling protocol stack 233 all while telephony application also receives the same messages through translator 244 and maintains a record of the telecommunications session state in the manner described in the discussion with respect to FIG. 5B.

At task 430, telecommunications terminal 110 switches to running system software 240 as its active software environment. When system software 240 is made the active software environment, its user interface becomes visible on the display of terminal 110. Furthermore, those skilled in the art will recognize, after reading this disclosure, that in situations in which virtualization layer 220 runs on top of a native operating system, system software 240 will be an application executing in the native operating system instead of a separate software environment. Correspondingly, it will be clear to those skilled in the art, after reading this disclosure, how to make and use alternative embodiments of the present invention in which, at task 230, telecommunications terminal 110 makes system software 240 the active window that is open in the native operating system.

Furthermore, those skilled in the art will recognize, after reading this disclosure, that in situations in which virtualization layer 220 runs on top of a native operating system, system software 240 will be an application executing in the native operating system instead of a separate software environment. Correspondingly, it will be clear to those skilled in the art, after reading this disclosure, how to make and use alternative embodiments of the present invention in which at task 430, telecommunications terminal 110 activates system software 240 (e.g. makes system software 240 the active window that is open in the native operating system), instead of selecting it as its active software environment.

At task 440, telephony application 242 changes the state of the telecommunications session without interrupting the telecommunications session. In accordance with the illustrative embodiment of the present invention, telephony application 242 joins user 140-2 to the telecommunications session, but it will be clear to those skilled in the art, after reading this disclosure, how to make and use alternative embodiments of the present invention in which the change of the state is any change permitted by the telecommunications protocol used. Furthermore, it will be clear to those skilled in the art, after reading this disclosure, how to make and use alternative embodiments of the present invention in which, at task 440, telephony application 242 answers an invitation to participate in a telecommunications session which has been received at terminal 110 while system software 230 is the active software environment running on terminal 110. The execution of task 440 is described in further detail in the discussions with respect to FIG. 6A and FIG. 6B.

FIG. 5A depicts a flowchart of the salient subtasks performed by telephony application 232 and signaling task 233 in the execution of task 410. It will be clear to those skilled in the art, after reading this disclosure, how to perform the tasks associated with FIG. 5A in a different order than represented or to perform one or more of the tasks concurrently. Furthermore, it will be clear to those skilled in the art, after reading this disclosure, how to make and use alternative embodiments of the present invention that omit one or more of the tasks.

At task 510-A, telephony application 232 and signaling protocol stack 233 exchange messages via message bus 310 in order start the telecommunications session. The messages are used to initialize signaling protocol stack 233 and to instruct it to transmit appropriate Session Initiation Protocol (SIP) signaling to the far-end party. Those skilled in the art will recognize, after reading this disclosure, that the messages exchanged via message bus 310 indicate specific functions provided by either of signaling protocol stack 233 and telephony application 244 and/or data and data structures (e.g. function parameters, function return values, etc.). Upon receipt of the messages, the indicated functions are executed and/or the data is processed by the message recipients. Furthermore, in accordance with the illustrative embodiment of the present invention, when messages are broadcast on message bus 310, they are also received by telephony application 242 which processes the messages in order to maintain a record of the state of the telecommunications session.

At task 520-A, signaling protocol stack 233 transmits and receives the Session Initiation Protocol (SIP) signaling necessary to start the telecommunications session over telecommunications network 120. It will be clear to those skilled in the art how to execute task 520-A.

At task 530-A, the telephone call media is encoded, decoded, and reproduced. In accordance with the illustrative embodiment of the present invention, hardware 210 detects that incoming voice packets are received from network 120. The received packets are placed in a buffer and decoded into raw audio data. The raw audio data is sent to the audio interface of terminal 110 for reproduction. In accordance with the illustrative embodiment of the present invention, the media decoding is accomplished by hardware 210, but it will be clear to those skilled in the art, after reading this disclosure, how to make and use alternative embodiments of the present invention in which the encoding is performed by a coder-decoder program (a.k.a. codec) located in a higher software layer, such as, for example, and without limitation, virtualization layer 220, and system software 230 or by telephony application 232.

FIG. 5B depicts a flowchart of the salient subtasks performed by telephony application 242 and translator 244 in the execution of task 410. The tasks associated with FIG. 5B are executed concurrently with the tasks associated with FIG. 5A. It will be clear to those skilled in the art, after reading this disclosure, how to perform the tasks associated with FIG. 5B in a different order than represented or to perform one or more of the tasks concurrently. Furthermore, it will be clear to those skilled in the art, after reading this disclosure, how to make and use alternative embodiments of the present invention that omit one or more of the tasks.

At task 510-B, translator 244 receives the messages broadcast in the execution of task 510-A. Although, only one message is discussed with respect to the illustrative embodiment of the present invention, those skilled in the art will appreciate that a plurality of messages may be exchanged between telephony application 232 and signaling protocol stack 233 in the course of initiating the telecommunications session. In accordance with the illustrative embodiment of the present invention, the message received is a call to a callback function of telephony application 232 indicating that a new incoming Session Initiation Protocol (SIP) message has been received by signaling protocol stack 233. It will be clear to those skilled in the art, after reading this disclosure, how to make and use alternative embodiments of the present invention in which the message received over message bus 310 performs other functions, such as, for example, and without limitation, to carry the return value for a function call made by the application, and so forth. Furthermore, in accordance with the illustrative embodiment of the present invention, the source of the received message is signaling protocol stack 233, but it will be clear to those skilled in the art, after reading this disclosure, how to make and use alternative embodiments of the present invention in which the source of the message is telephony application 232.

At task 520-B, translator 244 translates the message received at task 510-B into a form that is readable by telephony application 242. In accordance with the illustrative embodiment of the present invention, translator 244 determines that the message received at task 510-B indicates a call to a callback function of telephony application 232. Then, the translator extracts the payload of the function call, which is a data structure representing the Session Initiation Protocol (SIP) message, and converts the data structure to a form that is readable by telephony application 242. In accordance with the illustrative embodiment of the present invention, the source of the translated message is signaling protocol stack 233, but it will be clear to those skilled in the art, after reading this disclosure, how to make and use alternative embodiments of the present invention in which translator 244 translates, in a similar fashion, messages broadcast by telephony application 232.

At task 530-B, translator 244 forwards the translated message to telephony application 242. In accordance with the illustrative embodiment of the present invention, translator 244 forwards the converted data structure indicating the Session Initiation Protocol (SIP) message to telephony application 242 by calling a callback function which telephony application 242 has registered with translator 244. However, it will be clear to those skilled in the art, after reading this disclosure, how to make and use alternative embodiments of the present invention, in which translator 244 forwards the message by broadcasting it over message bus 310, placing it in shared memory, etc. Furthermore, it will be clear to those skilled in the art, after reading this disclosure, how to make and use alternative embodiments of the present invention in which translator 244 keeps a record of the received and translated messages and delivers information from that record to telephony application 242 only upon request.

At task 540-B, telephony application 242 receives the messages translated at task 520-B and maintains a record of the state of the telecommunications session. In accordance with the illustrative embodiment of the present invention, the state record comprises far-end party identification, media type of the telecommunications session (e.g. voice, video, etc.), names of call-back functions registered with SIP stack 233, etc. However, it will be clear to those skilled in the art, after reading this disclosure, how to make and use alternative embodiments of the present invention in which the state record comprises any item of information related to the telecommunications session. It will be clear to those skilled in the art how to determine what information is necessary to be included in the state record.

It will be clear to those skilled in the art, after reading this disclosure, how to make and use alternative embodiments of the present invention in which telephony application 242 maintains a record of one or more invitations to participate in telecommunications sessions that are received by signaling protocol stack 233 while system software 230 is the active software environment of terminal 110. In accordance with the alternative embodiments of the present invention, the record of the invitations comprises information that is needed by telephony application 242 in order to answer the invitations, such as, for example, and without limitation, a uniform resource identifier (URI) for the sender of the invitation, media capabilities of the sender (e.g. voice, video, etc.), so that telephony application 242 can answer the invitations if need arises. It will be clear to those skilled in the art how to determine what information is necessary to be included in the state record.

FIG. 6A depicts a flowchart of the salient subtasks performed by telephony application 242 and translator 244 in the execution of task 440. It will be clear to those skilled in the art, after reading this disclosure, how to perform the tasks associated with FIG. 6A in a different order than represented or to perform one or more of the tasks concurrently. Furthermore, it will be clear to those skilled in the art, after reading this disclosure, how to make and use alternative embodiments of the present invention that omit one or more of the tasks.

At task 610-A, telephony application 242 and signaling protocol stack 233 exchange messages, via message bus 310, in order to join user 140-2 to the telecommunications session. The messages are used to instruct signaling protocol stack 233 to exchange the appropriate Session Initiation Protocol (SIP) signaling with user 140-2 over telecommunications network 120. Those skilled in the art will recognize, after reading this disclosure, that the messages exchanged via message bus 310 indicate specific functions provided by either of signaling protocol stack 233 and one or more of the telephony applications, and/or data and data structures (e.g. function parameters, function return values, etc.). Upon receipt of the messages, the indicated functions are executed and/or the data is processed by the message recipients. Furthermore, in accordance with the illustrative embodiment of the present invention, when messages are broadcast on message bus 310, they are also received by telephony application 242 which processes the messages in order to maintain a record of the state of the telecommunications session.

At task 620-A, signaling protocol stack 233 transmits and receives over telecommunications network 120 the Session Initiation Protocol (SIP) signaling necessary to join user 140-1 to the telecommunications session. It will be clear to those skilled in the art how to execute task 620-A.

At task 630-A, the telephone call media is encoded, decoded, and reproduced. In accordance with the illustrative embodiment of the present invention, hardware 210 detects that incoming voice packets are received from network 120. The received packets are placed in a buffer and decoded into raw audio data. The raw audio data is sent to the audio interface of terminal 110 for reproduction. In accordance with the illustrative embodiment of the present invention, the media decoding is accomplished by hardware 210. However, it will be clear to those skilled in the art, after reading this disclosure, how to make and use alternative embodiments of the present invention in which the encoding is performed by a coder-decoder program (a.k.a. codec) located in a higher software layer, such as, for example, and without limitation, virtualization layer 220, and system software 230 or by telephony application 232.

Specifically, in the illustrative embodiments of the present invention in which the decoding of the incoming voice packets is performed by a coder-decoder program (a.k.a. codec) located in system software 232, a second coder-decoder program (a.k.a. codec), running in system software 240, is stared when system software 240 is switched to being the active software environment of terminal 110. The second coder-decoder program (a.k.a. codec) is configured to receive data from the buffer where the received packets are placed. And then, the second coder-decoder program (a.k.a. codec) is used to decode the media received by terminal 110.

FIG. 6B depicts a flowchart of the salient subtasks performed by telephony application 232 in the execution of task 440. The tasks associated with FIG. 6B are executed concurrently with the tasks associated with FIG. 6A. It will be clear to those skilled in the art, after reading this disclosure, how to perform the tasks associated with FIG. 6B in a different order than represented or to perform one or more of the tasks concurrently. Furthermore, it will be clear to those skilled in the art, after reading this disclosure, how to make and use alternative embodiments of the present invention that omit one or more of the tasks.

At task 610-B, telephony application 232 receives the messages broadcast by translator 244 at task 630-A.

At task 620-B, telephony application 232 maintains a record of the state of the telecommunications session. In accordance with the illustrative embodiment of the present invention, the state record comprises far-end party identification, media type of the telecommunications session (e.g. voice, video, etc.), number of parties engaged in the telecommunications session and so forth. However, it will be clear to those skilled in the art, after reading this disclosure, how to make and use alternative embodiments of the present invention in which the state record comprises any item of information related to the telecommunications session. It will be clear to those skilled in the art how to determine what information is necessary to be included in the state record.

FIG. 7A depicts a flowchart of the execution of the salient subtasks of task 610-A that are associated with the broadcasting of messages by telephony application 242. It will be clear to those skilled in the art, after reading this disclosure, how to perform the tasks associated with FIG. 7A in a different order than represented or to perform one or more of the tasks concurrently. Furthermore, it will be clear to those skilled in the art, after reading this disclosure, how to make and use alternative embodiments of the present invention that omit one or more of the tasks.

At task 710-A, telephony application 242 forwards a message to translator 244 instructing it to join user 140-2 to the telecommunications session. In accordance with the illustrative embodiment of the present invention, telephony application 242 calls the application programming interface (API) provided by translator 244 in order to utilize the functionality of signaling protocol stack 233. Although, only one message is discussed with respect to the illustrative embodiment of the present invention, those skilled in the art will appreciate that a plurality of messages may be sent by telephony application 242 in the course of joining user 140-2 to the telecommunications session. In accordance with the illustrative embodiment of the present invention, telephony application 242 calls the application programming interface (API) of translator 244 directly, but those skilled in the art will appreciate, after reading this disclosure, that the call can be accomplished via message bus 310, as well.

At task 720-A, translator 244 receives and translates the message forwarded by telephony application 242 at task 710-A. In accordance with the illustrative embodiment of the present invention, translator 244 determines that the message received indicates a call to a function and it also determines that the message seeks a change of state of the telecommunications session which can be accomplished by signaling protocol 233. Then, the translator extracts the payload of the function call, translates it to a form readable by signaling protocol stack 233, and makes the necessary calls to the application programming interface (API) of signaling protocol stack 233 in order to achieve the desired change of state (which is joining user 140-2).

At task 730-A, translator 244 broadcasts a message indicating the call to signaling protocol stack 233 and the translated payload via message bus 310.

FIG. 7B depicts a flowchart of the execution of the salient subtasks of task 610-A that are associated with the receiving of messages broadcast over message bus 310 by telephony application 242. It will be clear to those skilled in the art, after reading this disclosure, how to perform the tasks associated with FIG. 7B in a different order than represented or to perform one or more of the tasks concurrently. Furthermore, it will be clear to those skilled in the art, after reading this disclosure, how to make and use alternative embodiments of the present invention that omit one or more of the tasks.

At task 710-B, virtual device driver 244 receives the messages transmitted by signaling protocol stack 233 during the execution of task 610-A. Although, only one message is discussed with respect to the illustrative embodiment of the present invention, those skilled in the art will appreciate that a plurality of messages may be received by telephony application 242 in the course of joining user 140-2 to the telecommunications session. In accordance with the illustrative embodiment of the present invention, the message is a call to a callback function provided by one of the telephony applications indicating that a new incoming Session Initiation Protocol (SIP) message has been received by signaling protocol stack 233 following the transmission of an INVITE Session Initiation Protocol (SIP) message by signaling protocol stack 233 inviting user 140-2 to join the telecommunications session. It will be clear to those skilled in the art, after reading this disclosure, how to make and use alternative embodiments of the present invention in which the message received over message bus 310 performs other functions, such as, for example, and without limitation, to carry the return value of function calls and so forth.

At task 720-B, translator 244 translates the message received at task 710-B into a form that is readable by telephony application 242. In accordance with the illustrative embodiment of the present invention, translator 244 determines that the message received indicates a call to a callback function. Then, the translator extracts the payload of the function call, which is a data structure representing the Session Initiation Protocol (SIP) message, and converts the data structure to a form that is readable by telephony application 242.

At task 730-B, translator 244 forwards the translated message to telephony application 242 in the fashion described in the discussion with respect to task 530-B.

What is claimed is:

1. A method comprising:
monitoring a state of a phone call with a first telephony application that runs on a first system software image, and a second telephony application that runs on a second system software image, wherein the first telephony application and the second telephony application are both executed on a device, wherein the first telephony application natively supports a signaling protocol stack running on the first system software image, and wherein the second telephony application lacks native support for the signaling protocol stack;
changing the state of the phone call from a first state to a second state with the first telephony application through the signaling protocol stack;
receiving an indication that the phone call has changed from the second state to a third state;
broadcasting the indication, via a processor, to (i) the first telephony application, and a translator that translates the indication into a translated signaling message that is readable by the second telephony application and forwards the translated signaling message to the second telephony application; and
changing the state of the phone call from the third state to a fourth state with the second telephony application.

2. The method of claim 1, wherein the indication is broadcast over a message bus shared by the first system software image and the second system software image.

3. The method of claim 1, wherein the phone call is effectuated through the signaling protocol stack.

4. A method comprising:
broadcasting a message inside a device that indicates a signaling message for a phone call initiated by a first telephony application, wherein the first telephony application runs on a first system software image having a signaling protocol stack, and wherein the first telephony application natively supports the signaling protocol stack running on the first system software image;
receiving and translating the message into a translated message that is compatible with a second telephony application, wherein the second telephony application runs on a second system software image that is different than the first system software image, wherein the second telephony application lacks native support for the signaling protocol stack, and wherein the first system software image and the second software image both reside on the device;
forwarding the translated message to the second telephony application; and
changing the state of the phone call from the second telephony application based on the contents of the translated message.

5. The method of claim 4, wherein the message is broadcast over a message bus shared by the first system software image and the second system software image.

6. The method of claim 4, wherein forwarding the translated message comprises broadcasting the translated message over a message bus.

7. The method of claim 4, wherein the phone call is effectuated through the signaling protocol stack located in the first system software image.

8. The method of claim 4, wherein the signaling message is broadcast by the signaling protocol stack executing on the first system software image.

9. The method of claim 4, wherein the first telephony application and the second telephony application are both executed on the device.

10. A method comprising:
receiving a broadcast message from a first telephony application running on a first system software image, wherein the broadcast message indicates a signaling message for a phone call that is conducted by the first telephony application through a signaling protocol stack running on the first system software image, wherein the first telephony application natively supports the signaling protocol stack;
translating the broadcast message into a translated message that is compatible with a second telephony application, wherein the second telephony application runs on a second system software image that is different from the first system software image, wherein the second telephony application lacks native support for the signaling protocol stack, and wherein the first system software image and the second software image both reside on a device;
forwarding the translated message to the second telephony application;
updating a state of the phone call at the second telephony application based on the contents of the signaling message.

11. The method of claim 10, further comprising switching to using the second telephony application for conducting the phone call, wherein the switch is based on the state of the phone call.

12. The method of claim 10, wherein the message is broadcast over a message bus.

13. The method of claim 10, wherein forwarding the translated message comprises broadcasting the translated message over a message bus.

14. The method of claim 10, wherein the phone call is effectuated through the signaling protocol stack executing on the first system software image.

15. A system comprising:
a processor; and
a computer-readable storage device storing instructions which, when executed by the processor, cause the processor to perform operations comprising:
monitoring a state of a phone call with a first telephony application that runs on a first system software image, and a second telephony application that runs on a second system software image, wherein the first telephony application and the second telephony application are both executed on a device, wherein the first telephony application natively supports a signaling protocol stack running on the first system software image, and wherein the second telephony application lacks native support for the signaling protocol stack;
changing the state of the phone call from a first state to a second state with the first telephony application through the signaling protocol stack;
receiving an indication that the phone call has changed from the second state to a third state;
broadcasting the indication to (i) the first telephony application, and (ii) a translator that translates the indication into a translated signaling message that is readable by the second telephony application and forwards the translated signaling message to the second telephony application; and
changing the state of the phone call from the third state to a fourth state with the second telephony application.

16. A computer-readable storage device storing instructions which, when executed by a processor, cause the processor to perform operations comprising:
monitoring a state of a phone call with a first telephony application that runs on a first system software image, and a second telephony application that runs on a second system software image, wherein the first telephony application and the second telephony application are both executed on a device, wherein the first telephony application natively supports a signaling protocol stack running on the first system software image, and wherein the second telephony application lacks native support for the signaling protocol stack;

changing the state of the phone call from a first state to a second state with the first telephony application through the signaling protocol stack;

receiving an indication that the phone call has changed from the second state to a third state;

broadcasting the indication to the first telephony application and a translator that translates the indication into a translated signaling message that is readable by the second telephony application and forwards the translated signaling message to the second telephony application; and changing the state of the phone call from the third state to a fourth state with the second telephony application.

17. The method of claim 1, wherein the signaling protocol stack is a session initiation protocol stack.

18. The method of claim 4, wherein the signaling protocol stack is a session initiation protocol stack.

19. The method of claim 10, wherein the signaling protocol stack is a session initiation protocol stack.

20. The system of claim 15, wherein the signaling protocol stack is a session initiation protocol stack.

* * * * *